(12) United States Patent
Pedone (10) Patent No.: US 11,750,720 B1
(45) Date of Patent: Sep. 5, 2023

(54) CACHE OPTIMIZATION AND INTERACTION CONTROL BASED ON LOCATION AND HISTORICAL INTERACTIONS

(71) Applicant: Truist Bank, Charlotte, NC (US)

(72) Inventor: Jason Pedone, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/990,063

(22) Filed: Nov. 18, 2022

(51) Int. Cl.
*H04L 67/5683* (2022.01)
*H04L 43/067* (2022.01)
*H04L 67/52* (2022.01)

(52) U.S. Cl.
CPC ........ *H04L 67/5683* (2022.05); *H04L 43/067* (2013.01); *H04L 67/52* (2022.05)

(58) Field of Classification Search
CPC .... H04L 67/5683; H04L 43/067; H04L 67/52
See application file for complete search history.

(56) References Cited

U.S. PATENT DOCUMENTS

| | | | |
|---|---|---|---|
| 2010/0293335 A1* | 11/2010 | Muthiah | G06F 12/0813 711/E12.001 |
| 2017/0195307 A1* | 7/2017 | Jones-McFadden | H04W 12/06 |
| 2019/0109926 A1* | 4/2019 | Hotchkies | H04L 67/01 |
| 2020/0005116 A1* | 1/2020 | Kuo | H04L 67/568 |

* cited by examiner

*Primary Examiner* — Benjamin M Thieu
(74) *Attorney, Agent, or Firm* — Kilpatrick Townsend & Stockton LLP; Michael A. Springs, Esq.

(57) ABSTRACT

A system can receive a predetermined entity preference from an entity device. The entity device can be associated with the entity. The system can receive a first location indicating that the entity is proximate to an interaction location from the entity device. The system can access historical interaction data of the entity related to an interaction location during a predetermined period. The system can cache the historical interaction data in a processor device dynamically selected based on computing capacity. The system can generate an interaction recommendation by executing the interaction instructions and by using the historical interaction data. The system can receive a second location indicating that the entity is not proximate to the interaction location. The system can clear the cached historical interaction data from the processor device, in response to determining that the entity is not proximate to the interaction location.

20 Claims, 3 Drawing Sheets

CACHE OPTIMIZATION AND INTERACTION CONTROL BASED ON LOCATION AND HISTORICAL INTERACTIONS

TECHNICAL FIELD

The present disclosure relates generally to cache optimization and interaction control and, more particularly (although not necessarily exclusively), to optimizing cache of historical interaction data and controlling interactions based on location data and historical interaction data.

BACKGROUND

Interactions between entities in a connected network can generate interaction data. The interaction data can be collected, aggregated, classified, and analyzed. Meanwhile, mobile devices and wearable devices with location awareness can provide accurate location data. Different applications can be installed on the mobile devices and wearable devices to facilitate entity interactions. Interaction data and location data can accumulate over time. Providing passive information can be easy based on historical data. However, it can be difficult to effectively process the interaction data and actively influence the interactions between different entities.

SUMMARY

In one example, a system can include one or more processor devices and a non-transitory computer-readable memory including instructions that can be executed by the processor device to perform various operations. The system can receive a predetermined entity preference from an entity device. The predetermined entity preference can include interaction instructions for interactions involving an entity. The entity device can be associated with the entity. The system can receive, from the entity device, a first location indicating that the entity is proximate to an interaction location. The system can access historical interaction data of the entity. The historical interaction data can include data related to previously executed interactions that involve the entity and the interaction location during a predetermined period. The system can cache the historical interaction data in a processor device selected dynamically from the one or more processor devices based on computing capacity. The system can generate an interaction recommendation relating to the interaction location by executing the interaction instructions and by using the historical interaction data. The system can transmit the interaction recommendation to the entity device. The system can receive a second location indicating that the entity is not proximate to the interaction location. The system can clear, in response to receiving the second location indicating that the entity is not proximate to the interaction location, the cached historical interaction data from the processor device.

In another example, a predetermined entity preference can be received from an entity device. The predetermined entity preference can include interaction instructions for interactions involving an entity. The entity device can be associated with the entity. A first location indicating that the entity is proximate to an interaction location can be received from the entity device. Historical interaction data of the entity can be accessed. The historical interaction data can include data related to previously executed interactions that involve the entity and the interaction location during a predetermined period. The historical interaction data can be cached in a processor device selected dynamically from the one or more processor devices based on computing capacity. An interaction recommendation relating to the interaction location can be generated by executing the interaction instructions and by using the historical interaction data. The interaction recommendation can be transmitted to the entity device. A second location indicating that the entity is not proximate to the interaction location can be received. The cached historical interaction data from the processor device can be cleared, in response to receiving the second location indicating that the entity is not proximate to the interaction location.

In a further example, a non-transitory computer-readable medium can include instructions that are executable by a processor for causing the processor to perform various operations. The operations can include receiving a predetermined entity preference from an entity device. The predetermined entity preference can include interaction instructions for interactions involving an entity. The entity device can be associated with the entity. The operations can include receiving, from the entity device, a first location indicating that the entity is proximate to an interaction location. The operations can include accessing historical interaction data of the entity. The historical interaction data can include data related to previously executed interactions that involve the entity and the interaction location during a predetermined period. The operations can include caching the historical interaction data in a processor device selected dynamically from the one or more processor devices based on computing capacity. The operations can include generating an interaction recommendation relating to the interaction location by executing the interaction instructions and by using the historical interaction data. The operations can include transmitting the interaction recommendation to the entity device. The operations can include receiving a second location indicating that the entity is not proximate to the interaction location. The operations can include clearing, in response to receiving the second location indicating that the entity is not proximate to the interaction location, the cached historical interaction data from the processor device.

DETAILED DESCRIPTION

Certain aspects and features of the present disclosure relate to optimizing data cache, generating an interaction recommendation, and controlling an interaction based on geolocation data, historical data, and the like. An interaction can include an exchange of resources between different entities. The different entities may include a user, an individual, organization, or other suitable entities that can control one or more resources. An interaction recommendation can include a suggestion relating to a pending interaction, future interactions, and the like. For example, a suggestion for a first entity can be to not interact with a second entity when the historical interaction data of the first entity exceeds a maximum aggregate value of interactions for a predetermined period set by the first entity. The interaction recommendation can also include a score indicating the likelihood of the entity exceeding the maximum aggregate value of interactions. In some examples, the interaction recommendation can be generated by a trained machine-learning model using geolocation data, interaction data, and historical interaction data. Geolocation data can include location data from entity devices with location awareness and location information related to certain interactions. Interaction data include an exchange value and information about the entities relating to the interaction. Historical interaction data can include exchange values and entity information related to past interactions. Historical interaction data can be analyzed to recommend and control a pending interaction or a future interaction. However, loading and processing large amounts of historical interaction data in a short period can burden the computing capacity of a computing system and delay recommending and controlling an interaction at a specific location.

Techniques are provided to solve the problem by caching historical interaction data related to a specific location on a processor device before an entity device is at the specific location but proximate to the specific location. An interaction at the specific location can be recommended and controlled based on the cached historical interaction data related to the specific location. When the entity device moves away from the specific location, the cache can be cleared to provide space for caching data for the next location of interest. The caching can be carried out by one or more processors. When there are two or more processors, a processor can be selected dynamically for caching and analyzing historical interaction data based on available computing capacity. The computing system can rank the two or more processors based on the available computing capacity of each processor. The processor with the largest computing capacity available can be selected for caching and processing the historical transaction data for a specific location. Both clearing cached historical interaction data based on location change and dynamic selection of processors for caching the historical interaction data can optimize data cache on the one or more processors, enhance the usage of computing power, and improve the data processing functionality of the computer system.

The optimized cache of historical interaction data can then be used for recommending and controlling pending and future interactions timely. Interactions are recommended according to entity-defined parameters and preferences. Interaction recommendations can be provided to a user interface on an entity device such as a wearable device, a mobile device, or the like. Interaction recommendations can be informational, may solicit entity action, or a combination thereof. Interaction recommendations that request an entity action can be in response to intercepting an interaction that can be monitored and paused awaiting entity input on a decision regarding authorizing the interaction. Controlling interactions can involve authorizing a pending interaction or canceling the pending interaction based on entity-defined parameters and preferences, interaction recommendations, entity inputs, or the like.

A system for generating interaction recommendations and controlling interactions for entities can include a coordination engine, a location-based recommendation engine, a historical-based recommendation engine, an initiation-based recommendation engine, and an interaction decisioning engine. Connected entity devices can facilitate generation of various interaction recommendations. The connected entity devices can be smart phones with location awareness. The connected entity devices can also be wearable devices with location awareness, for example, smart watches and smart glasses. An application can be installed to the entity devices to support entity communications with the system, including providing location data, viewing recommendations, and decisioning interactions.

The coordination engine can transmit location data from the entity device in a continuous fashion down to a location-based recommendation engine for generating location-based recommendations. The coordination engine can push the location-based recommendations to the entity device in response to the location data. The location-based recommendation engine can include application programming interface (API) endpoints and supporting logic that can process location data from the entity device in conjunction with map or location data from external sources to generate location-based recommendations based on parameters and preferences set by the entity. When a specific website relating to certain types of interactions is active on the entity device, the location-based recommendation engine can translate the IP address associated with the website to a physical address and collect relevant information related to the physical address, such as the type of interactions it conducts. The location-based recommendation engine can then retrieve relevant interaction history data related to the physical address and the interaction type at the physical address. When an entity is proximate to a certain location, the system can extract interaction history data related to the certain location from database and cache, on a processor device, the relevant interaction history data for generating location-based recommendations. By caching historical interaction data based on location data, the historical interaction data can be ready before the entity is at an interaction location. The system can generate an interaction recommendation for the entity at the interaction location faster than receiving historical interaction data from interaction history databases without caching in advance. The interaction recommendation can be provided to the entity in a timely manner. The system can include one or more processor devices. When there are more than two processor devices, One processor device can be selected for caching and processing historical interaction data. Once the entity is not proximate to the certain location, the system can automatically clear the cache and release space for interaction history data for generating recommendations related to the next location. By clearing the historical interaction data related to a certain location cached on a processor device when the entity is not proximate to the certain location, the burden on the computing capacity of the computing device can be reduced and fewer computational resources such as computer memory can be used. The processor device can have capacity to cache and process historical interaction data related to a next location and generate an interaction recommendation for the next location timely. The location-based recommendation engine can further lock or deactivate one or more objects associated with the entity temporarily for a certain period or until the entity requests to unlock or deactivate the one or more objects. By taking advantage of location awareness with a mobile or wearable device, the system can push more relevant recommendations regarding the entity's parameters and preferences.

Moreover, the coordination engine can generate and push historical-based recommendations in a batch fashion to the entity device. The historical-based recommendation engine can include API endpoints and supporting logic that can process interaction history data in a batch process to generate pre-staged recommendations according to the entity's parameters and preferences. The historical-based recommendation engine can push recommendations to the user device in a pre-scheduled batch fashion as specified in the entity's parameters and preferences. The historical-based recommendation engine can also generate a score indicating a likelihood of the entity exceeding a maximum aggregate value of interactions. For example, the score is in a range from 0 to 100. The higher the score is, the less likely the entity can be to exceed the maximum aggregate value of interactions set by the entity.

In some examples, the historical-based recommendation engine can train and execute a machine-learning model for making recommendations to end-users in a batch manner. The machine-learning model may include a neural network, such as a deep-learning neural network, a recurrent neural network, and the like, a support vector machine, etc. The historical-based recommendation engine can use interaction history data relating to an end-user and other similar users to train the machine-learning model. For example, the historical-based recommendation engine can access, receive, or retrieve interaction history data for an entity and other entities with similar parameters at regular intervals, such as daily, weekly, bi-weekly, monthly, etc. The historical-based recommendation engine may label the interaction history data or may use an unlabeled version of the interaction history data to train the machine-learning model via supervised training techniques, unsupervised training techniques, semi-supervised training techniques, or any combination thereof. Training the machine-learning model may cause weights between layers of the machine-learning model to be tuned for optimizing predictions or other suitable outputs provided by the machine-learning model. For example, the historical-based recommendation engine can train the machine-learning model and tune the weights of the machine-learning model to cause the machine-learning model to optimize actionable recommendations for a specific entity.

Further, the coordination engine may include API endpoints and supporting logic that can process and direct all interactions between the user interfaces and supporting sub-components, such as the initiation-based recommendation engine, the interaction decisioning engine, the location-based recommendation engine, and the historical-based recommendation engine, according to the parameters and preferences set by entities. Parameters can be a maximum value for a one-time interaction, for a certain interaction type, or a maximum aggregate value of interactions for a predetermined period. An interaction type can involve exchanges of different categories of resources. Recommendation preferences can include receiving a message if the maximum value for a one-time interaction or a maximum aggregate value of interactions for a predetermined period is to be exceeded with a pending interaction. The recommendation preferences can also include receiving a location-based recommendation message when the entity is proximate to a location. The insight preferences can also include receiving a historical-based recommendation message at certain time with a certain frequency such as at a particular time every day. The parameters and preferences can be updated in the coordination engine.

The coordination engine can handle the communication between an entity device and the initiation-based recommendation engine and the interaction decisioning engine. The interaction decisioning engine can intercept all pending interactions initiated by an entity before the pending interactions are transmitted to an authorization platform for final authorization. If an entity has appropriate parameters and preferences set in the system, the interaction decisioning engine can intercept and hold an interaction initiated by the entity before it is executed. The initiation-based recommendation engine can generate and push an initiation-based message, regarding a pending interaction initiated by an entity, to the entity device substantially contemporaneous with initiating the pending interaction. Historical interaction data may also be used for generating the substantially contemporaneous message. The message may require the entity to decide whether to proceed with the pending interaction via the entity device. The end user's decision may be to authorize or decline the pending interaction. The entity's decision can then be pushed back down from the entity device to the interaction decisioning engine. The pending interaction can be authorized or declined according to the entity's decision.

The initiation-based recommendation engine and interaction decisioning engine can also detect and prevent unauthorized interactions. After the interaction decisioning engine intercepts a pending interaction, the initiation-based recommendation engine can detect the location where the pending interaction is initiated and the location of the entity device. If the two locations match, the message regarding the pending interaction may not include an alert to the entity device. If the two locations do not match, the message may include an alert. The alert can also be a separate message to the entity device for entity verification.

In one example, an end-user can set preferences such as "if I am about to spend over $500 at one interaction, I want to have a second thought about it," "my monthly spending budget is $2000," and "I'd like to receive recommendations and insights based on my location and past spending." When the end-user is proximate to a location, the system can generate an insight message using the end-user's spending comparing to the monthly spending budget. The end-user can make decisions based on the insight message. If historical interactions are already close to or equal to the budget, the system can also deactivate the end-user's credit card for preventing the end-user from exceeding the budget. When the end-user is about to acquire an item costing over $500 at the location, the interaction can be intercepted before it is transmitted to the credit card issuing bank for execution. The system can generate a message to the end-user that "you are spending over $500 for one transaction, are you sure about it?" or it can deactivate the credit card temporarily for preventing the transaction. The system can also generate a daily message to remind the end-user's financial standing with regard to the monthly spending budget, and provide actionable recommendations based on the end-user's interaction history.

The systems and methods of the present disclosure are integrated into a practical application of generating interaction recommendations and controlling interactions between different entities. The systems and methods also improve the functionality of a computing device. A processor device can cache relevant historical interaction data when an entity is proximate to an interaction location. The computing device can process data faster when generating an interaction recommendation relating to the interaction location. By clearing the historical interaction data on the processor device when the entity is not proximate to the interaction location, the burden on the computing capacity of the computing device can be reduced and fewer computational resources such as computer memory can be used. When there is more than one processor, the processor with capacity required to process the historical interaction data can be dynamically selected to cache and process the historical interaction data. Both clearing cached data based on location change and dynamic selection of processors for caching can optimize data cache on one or more processor devices, enhance the usage of computing power, and improve the data processing functionality of the computer. Additionally, the systems and methods also improve the technology of providing interaction recommendations. By caching historical interaction data based on location data, the historical interaction data can be ready before the entity is at an interaction location. The systems and methods can generate an interaction recommendation for the entity at the interaction location faster than receiving historical interaction data from interaction history databases without caching in advance. The interaction recommendation can be provided to the entity in a timely manner. By using a machine-learning algorithm trained with historical interaction data, the interaction recommendation can be generated with greater relevancy and accuracy. The interactions between different entities include exchange electronic resources. The systems and methods can also control access to the electronic resources based on interaction recommendations.

These illustrative examples are given to introduce the reader to the general subject matter discussed here and are not intended to limit the scope of the disclosed concepts. In the following description, for the purposes of explanation, specific details are set forth to provide a thorough understanding of various implementations and examples. Various implementations may be practiced without these specific details. The figures and description are not intended to be restrictive.

Figure 1:
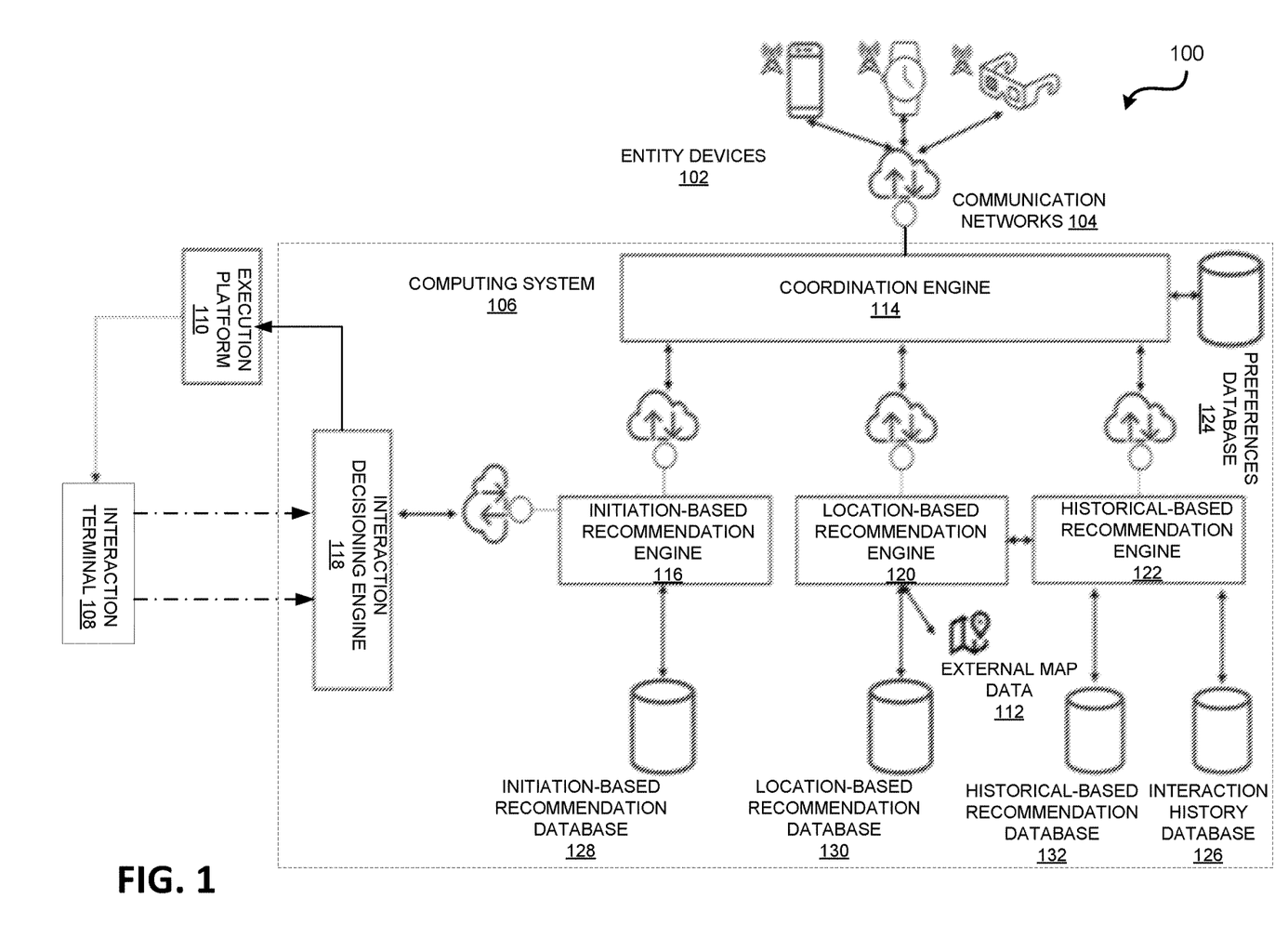
FIG. 1 is a schematic of a network environment in which cache of historical interaction data can be optimized and an interaction can be recommended and controlled using geolocation data and historical interaction data according to one example of the present disclosure.

FIG. 1 is a schematic of a network environment 100 in which cache of historical interaction data can be optimized and an interaction can be recommended and controlled using geolocation data and historical interaction data according to one example of the present disclosure. The network environment 100 can include entity devices 102, one or more communication networks 104, and a computing system 106. The entity devices 102 are configured with location awareness. The entity devices 102 can transmit location data and input data to and receive recommendation data from the computing system 106 over the one or more communications networks 104. The network environment 100 may correspond to a Wide Area Network ("WAN") environment, such as the Internet, through which the entity devices 102 may communicate with servers, such as the computing system 106, via web browsers or client-side applications, to establish communication sessions, send and receive web-based information, and access other suitable features of applications or services.

The computing system may be communicatively coupled to one or more external system, such as interaction terminals 108, execution platforms 110, and external map data sources 112. The interaction terminals can be a point of sale (POS) or a virtual payment terminal on an online marketplace platform.

The computing system 106 may be or include any type of server including, for example, a rack server, a tower server, a miniature server, a blade server, a mini rack server, a mobile server, an ultra-dense server, a super server, or the like. The computing system 106 may include various hardware components such as a motherboard, processing units, memory systems, hard drives, network interfaces, power supplies, etc. The computing system may include one or more server farms, clusters, or any other appropriate arrangement or combination of computer servers. Additionally, the computing system 106 may act according to stored instructions located in a memory subsystem of the computing system and may execute an operating system or other applications. In some examples, the computing system may be other types of computer systems other than servers.

The computing system 106 may implement several different applications, services, or modules, and the computing system 106 may perform additional server-side functionality. In one example, the computing system 106 can include a coordination engine 114, an initiation-based recommendation engine 116, an interaction decisioning engine 118, a location-based recommendation engine 120, and a historical-based recommendation engine 122. The coordination engine 114 may be configured to interact with the entity devices 102 for setting parameters and preferences, collecting location data, and delivering recommendation messages from different types of recommendation engines. Parameters and preferences for an entity can be stored in preferences database 124 in the computing system 106. The initiation-based recommendation engine 116 may be configured to create a recommendation message per interaction when the interaction decisioning engine 118 can intercept a pending interaction initiated by an entity at an interaction terminal 108 before the pending interaction is transmitted to an execution platform 110 for execution. The initiation-based recommendation engine can generate a recommendation substantially contemporaneously regarding the pending interaction using data included in the pending interaction, interaction history data stored in an interaction history database 126, and entity parameters and preferences stored in the preferences database 124. The initiation-based recommendation message can be transmitted to an entity device 102 via API endpoints of the coordination engine 114. The entity device 102 may transmit decision data regarding the pending interaction to the initiation-based recommendation engine 116 via API endpoints of the coordination engine 114. The interaction decisioning engine 118 may be configured to decision the pending interaction based on decision data from entity devices 102. The decisioning can be authorizing the pending interaction for execution by an execution platform 110. The decisioning can also be canceling the pending interaction.

The location-based recommendation engine 120 may be configured to generate location-based recommendations using location data from entity devices 102, external map data from external map data sources 112, interaction history data from the interaction history database 126, and entity parameters and preferences stored in the preferences database 124. A location-based recommendation message can be transmitted to the entity device 102 via API endpoints of the coordination engine 114.

The historical-based recommendation engine 122 may be configured to generate recommendations using interaction history data stored in the interaction history database 126 and entity parameters and preferences stored in the preferences database 124. A recommendation message can be transmitted to the entity device 102 via API endpoints of the coordination engine 114.

For example, in implementations of banking or financial services systems, electronic commerce systems, and the like, web-based resources, such as a webpage or any feature or functionality thereof, provided by the computing system 106 may be used by the entity devices 102 to perform various functions, such as receiving insight messages and transmitting decision data based on the insight messages. The entity devices 102, which can include suitable user devices for accessing web-based resources or application-based resources, can be capable of accessing and establishing communication sessions with the computing system 106 and, in some examples, the external systems through the communication networks 104. As illustrated in FIG. 1, entity devices 102 can be mobile devices, including but not limited to tablet computers, smartphones, smart watches, and smart glasses, which may access the computing system 106 via a Local Area Network (LAN) or Wide Area Network (WAN), as well as mobile telecommunication networks, short-range wireless networks, or various other communication network types such as cable networks or satellite networks.

Although certain components are shown in FIG. 1, other suitable, compatible, network hardware components and network architecture designs may be implemented in various embodiments to support communication between the entity devices 102, the computing system 106, and various external systems, such as interaction terminals 108, execution platforms 110, and external map data sources 112. Such communication networks may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the entity devices 102 and the computing system 106 in FIG. 1 may be local area networks, such as one based on Ethernet, Token-Ring or the like. Such network(s) also may be wide-area networks, such as the Internet, or may include financial or banking networks, telecommunication networks such as a public switched telephone networks (PSTNs), cellular or other wireless networks, satellite networks, television or cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
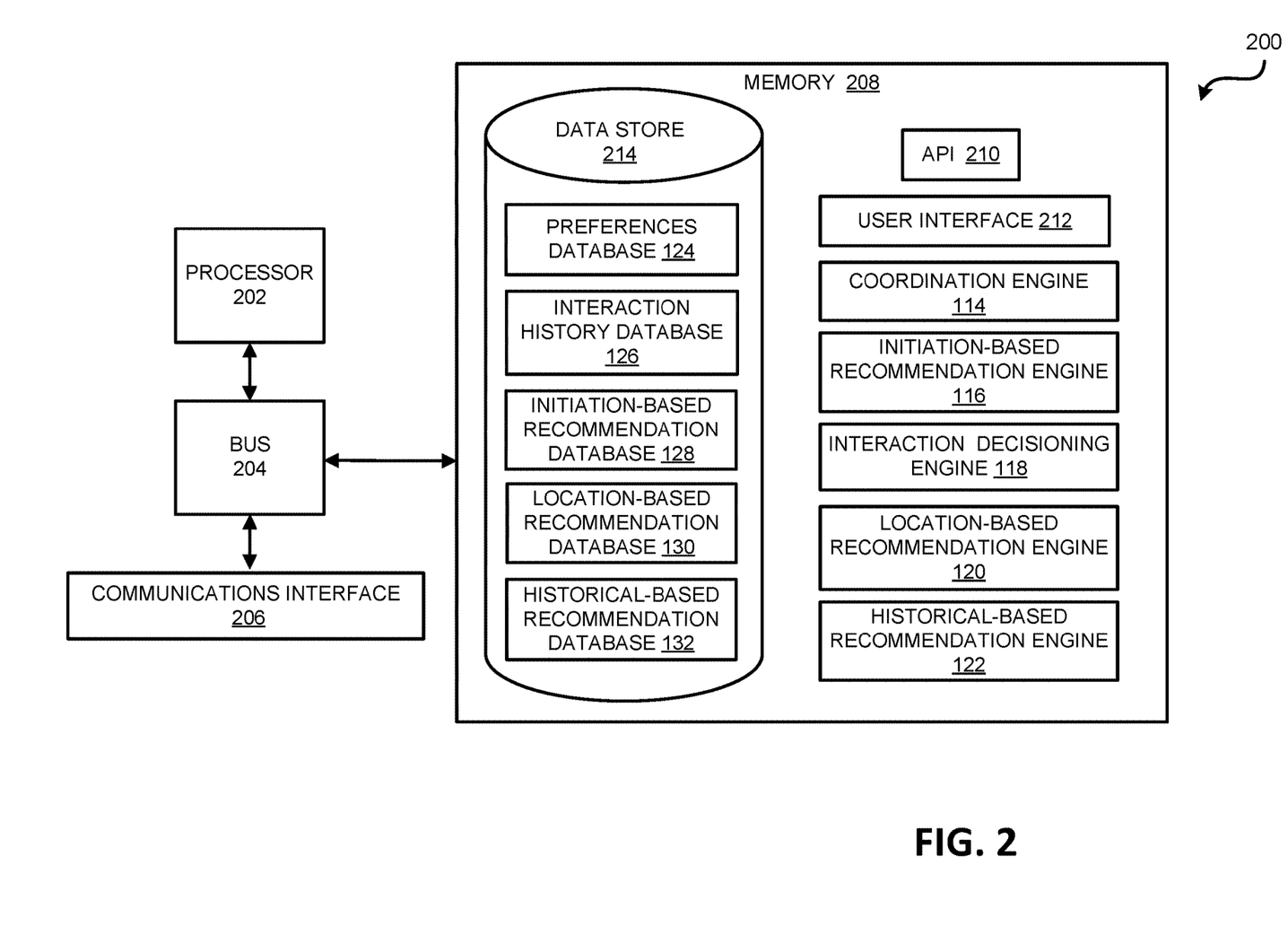
FIG. 2 is a block diagram of an example of a computing system configured to optimize caching of historical interaction data, recommend an interaction, and control an interaction using geolocation data and historical interaction data according to one example of the present disclosure.

FIG. 2 is a block diagram of an example of a computing system 200 configured to optimize caching of historical interaction data, recommend an interaction, and control an interaction using geolocation data and historical interaction data according to one example of the present disclosure. The computing system 200 in FIG. 2 can be a detailed configuration of the computing system 106 in FIG. 1. The computing system 200 may be a network device and may include a processor 202, a bus 204, a communications interface 206, a memory 208, and other suitable components. In some examples, the components illustrated in FIG. 2 may be integrated into a single structure. For example, the components can be within a single housing. In other examples, the components illustrated in FIG. 2 can be distributed, for example in separate housings and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. The multiple processing devices can be located within one housing or distributed over a network. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, Java, Perl, Python, etc.

The communications interface 206 may interface with other network devices or network-capable devices external to the computing system 200. Information received from the communications interface 206 may be sent to the memory 208 via the bus 204. The memory 208 can store any information received from the communications interface 206.

The memory 208 may include program codes for controlling interactions and generating recommendations, and the like. The program codes include APIs 210 configured to make API calls to external systems, such as communicating with entity devices 102, interaction terminals 108, and execution platforms 110 in FIG. 1, and requesting access to external map data sources 112 in FIG. 1.

The program codes may cause the computing system 200, or any suitable component thereof, to generate a user interface 212 configured to provide a user interface to the entity devices 102 for receiving information, such as login credentials or other confidential information and input data, for providing information, such as recommendation messages, etc. In some examples, the user interface 212 may be a customizable user interface that may be presented to an entity on an entity device 102.

The memory 208 may also include program codes for a coordination engine 114, an initiation-based recommendation engine 116, an interaction decisioning engine 118, a location-based recommendation engine 120, and a historical-based recommendation engine 122. The memory 208 may additionally include program codes for a data store module 214. The data store module 214 may include a preferences database 124, an interaction history database 126, an initiation-based recommendation database 128, a location-based recommendation database 130, a historical-based recommendation database 132. In some examples, the computing system 200 accesses to an external interaction history database, and the interaction history database 126 may temporarily store retrieved interaction history data needed for controlling pending interactions and generating recommendations. Besides, the data store module 214 may store information relating to one or more entity objects for associated entities and entity devices, including but not limited to username, password, security information, and entity identification.

Figure 3:
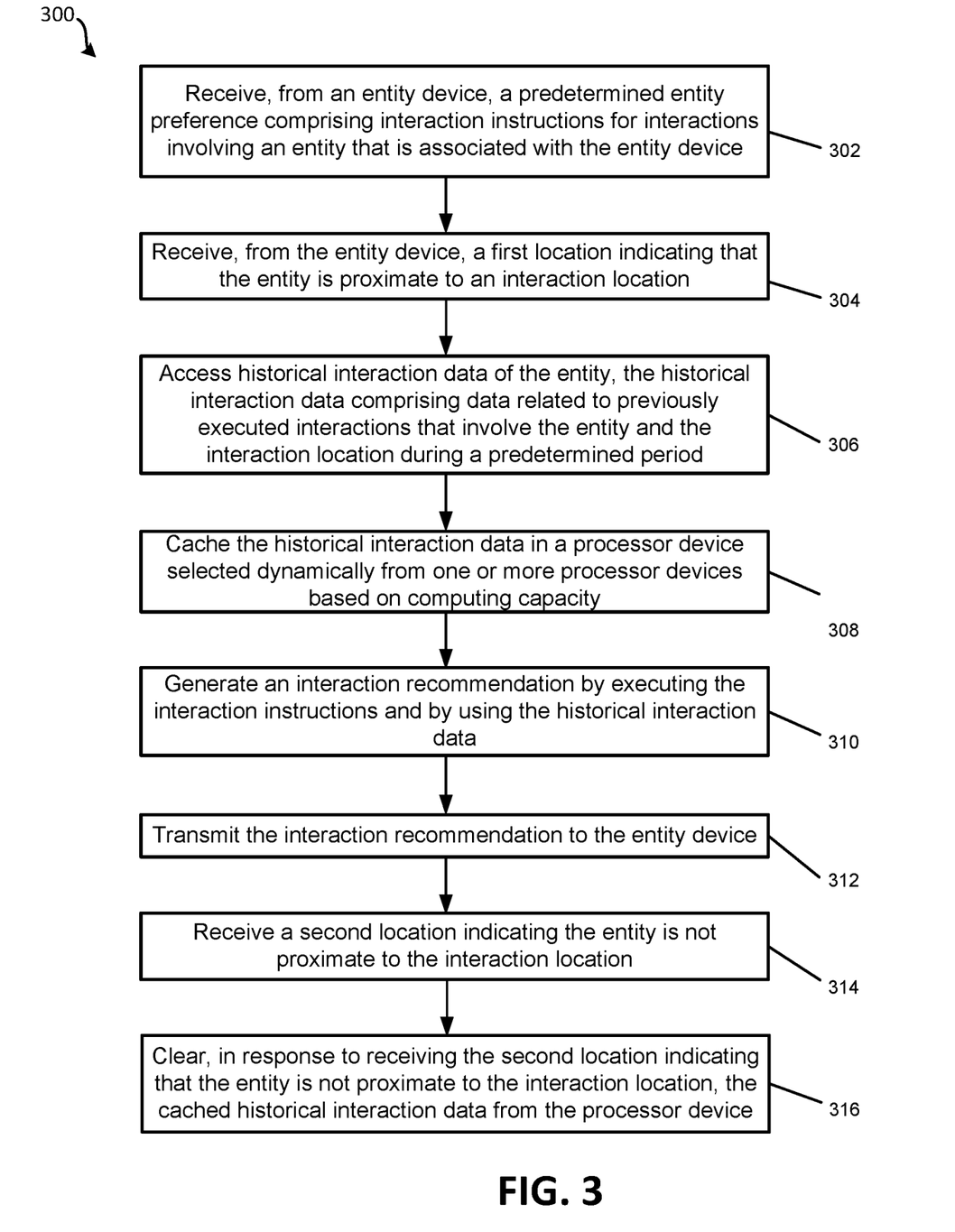
FIG. 3 is a flowchart of a process for optimizing cache of historical interaction data and recommending and controlling an interaction based on location data and historical interaction data according to one example of the present disclosure.

FIG. 3 is a flowchart of a process 300 for optimizing cache of historical interaction data and recommending and controlling an interaction based on location data and historical interaction data according to one example of the present disclosure. At block 302, the computing system 106 receives from an entity device 102 a predetermined entity preference. The predetermined entity preference can include interaction instructions for interactions involving an entity. The computing system 106 can provide a client-side application installed on the entity device 102. The client-side application can provide a user interface 212 for the entity device 102 to communicate with the computing system 106. The entity device 102 can provide a predetermined entity preference to the computing system 106 via the user interface 212. The coordination engine 114 can receive the predetermined entity preference from the entity device over a communication network 104. The entity device 102 can be associated with the entity. The coordination engine 114 can store the predetermined entity preference in the preferences database 124. The predetermined preference of the entity can be related to interactions involving the entity. For example, the predetermine preference can be a maximum aggregate value of interactions for a predetermined period. It can be used for generating interaction recommendations for the entity and control certain objects related to the entity.

At block 304, the computing system 106 receives from the entity device 102 a first location indicating that the entity is proximate to an interaction location. The entity device 102 can be configured with location awareness. For example, the entity device 102 can collect location data via Global Positioning System (GPS), IP address, Wi-Fi connection, or user report. The computing system 106 can receive location data from the entity device 102 via the client-side application installed on the entity device 102. The location-based recommendation engine 120 may access to external map data sources 112 to identify additional information related to the location data, such as an interaction location of interest.

At block 306, the computing system 106 accesses historical interaction data of the entity. The historical interaction data can include data related to previously executed interactions that involve the entity and the interaction location during a predetermined period. The predetermined period can be based on the predetermined entity preference. For example, the predetermine entity preference can be a maximum aggregate value of interactions for a month, the predetermined period can then be a period from the beginning of a month to date. The historical interaction data can be stored in the interaction history database 126 of the computing system 106. In some examples, the historical interaction data can be stored in a remote database. the computing system 106 can request access to the historical interaction data in the remote database and store retrieved historical interaction data in the interaction history database 126. In some examples, the interaction location can be a website related to the predetermined entity preference. The computing system 106 can determine that the website related to the predetermined entity preference is active on the entity device 102. The predetermined entity preference can be determined based on input received from a first entity. The computing system 106 can identify a second entity associated with the website. The computing system 106 can access the historical interaction data of the first entity involving the second entity during the predetermined period.

At block 308, the computing system 106 caches the historical interaction data in a processor device selected dynamically from one or more processor devices based on computing capacity. Historical interaction data can include data within different categories. For example, some of the categories can include an interaction time, an interaction address, an interaction type, and an interaction value. The historical interaction data involving the entity and the interaction location during the predetermined period can be cached on the processor 202 when the entity is proximate to the interaction location. The processor device can be the processor 202. In some examples, the computing system 106 can be a distributed system comprising two or more processors over the network. One processor can be selected or assigned dynamically for caching and analyzing historical interaction data based on available computing capacity. The computing system can rank the two or more processors based on the available computing capacity of each processor. The processor with the largest computing capacity available can be selected for caching and processing the historical transaction data. The selected processor can query the interaction history database 126 or a remote database for historical interaction data of the entity related to the interaction location. The selection can be dynamic. That is, any available processor with the capacity required for caching and processing the historical interaction data can carry out the performance. By caching the historical interaction data in advance, the burden for the computing system to access data and process data at the interaction location is reduced. This way, the processor 202 can process the historical interaction data to generate an interaction recommendation in a timely manner.

At block 310, the computing system 106 generates an interaction recommendation by executing the interaction instructions and by using the historical interaction data. The location-based recommendation engine 120 can generate the interaction recommendation using the historical interaction data by executing the interaction instructions.

In some examples, the interaction instructions from the entity can include a maximum aggregate value of interactions for the predetermined period. The maximum aggregate value of interactions for the predetermined period can be a monthly budget limit. The location-based recommendation engine 120 can determine that an aggregate value of the historical interaction data of the entity is equal to or greater than the maximum aggregate value of interactions for the predetermined period. The location-based recommendation engine 120 can then deactivate a set of objects associated with the entity. The set of objects can provide electronic resources at the interaction location. The entity device 102 can transmit an entity input to the location-based recommendation engine 120 regarding the deactivated set of objects. For example, the entity input can be reactivating the set of objects. The location-based recommendation engine 120 can then reactivate the deactivated set of objects associated with the entity upon receiving the entity input. The set of objects can be one or more financial accounts associated with the entity.

In some examples, the historical-based recommendation engine 122 can generate a score using the historical interaction data and the maximum aggregate value of interactions for the predetermined period. The score can be in a range from 0 to 100. The score can indicate a likelihood of the entity exceeding the maximum aggregate value of interactions. The higher the score is, the less likely that the entity can be to exceed the maximum aggregate value of interactions for the predetermined period. In some examples, the score can be included in the interaction recommendation generated for a specific location. In some examples, the score can be transmitted separately to the entity device at a predetermined frequency, such as at a particular time every day.

In some examples, the location-based recommendation engine 120 can train a machine-learning model with the historical interaction data as a training dataset in a batch manner with the pre-scheduled frequency. The historical interaction data can be updated daily for an interaction location. The location-based recommendation engine 120 can then execute the trained machine-learning model to generate the interaction recommendation for the interaction location.

Similarly, in some examples, the historical-based recommendation engine 122 can train a machine-learning model with interaction history data as a training dataset in a batch manner at a pre-scheduled frequency. The historical interaction data may not be limited to one interaction location. The historical-based recommendation engine 122 can generate interaction recommendations at a pre-schedule frequency by executing the trained machine-learning model.

At block 312, the computing system 106 transmits the interaction recommendation to the entity device 102. The location-based recommendation engine 120 can send the interaction recommendation to the entity device 102 via the coordination engine 114. The client-side application on the entity device received the interaction recommendation. The interaction recommendation can be displayed as a notification message on the entity device 102.

At block 314, the computing system 106 receives a second location indicating the entity is not proximate to the interaction location. The entity device 102 can collect new location data when the entity moves away from the interaction location with the entity device 102. The entity device 102 can send a second location to the location-based recommendation engine 120 via the coordination engine 114. The location-based recommendation engine 120 may access to external map data sources 112 to identify additional information related to the new location data, indicating that the entity is not proximate to the interaction location.

At block 316, the computing system 106 clears the cached historical interaction data from the processor device, in response to receiving the second location indicating that the entity is not proximate to the interaction location. The processor 202 can clear the historical interaction data that is related to the interaction location once the entity device 102 is not proximate to the interaction location. In some examples, the computing system 106 can be a distributed system comprising two or more processors over the network. A selected processor for processing historical interaction data can clear the cached historical interaction data for the interaction location when the entity is not proximate to the interaction location. When the location-based recommendation engine 120 determines that the entity device 102 is proximate to a next interaction location, the same processor or another selected processor can start to query the interaction history database 126 or a remote database to receive and cache historical interaction data for the next interaction location.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system, comprising:
one or more processor devices; and
a non-transitory computer-readable memory including instructions that are executable by the processor device to perform operations comprising:
receiving, from an entity device, a predetermined entity preference comprising interaction instructions for interactions involving an entity that is associated with the entity device;
receiving, from the entity device, a first location indicating that the entity is proximate to an interaction location;
accessing historical interaction data of the entity, the historical interaction data comprising data related to previously executed interactions that involve the entity and the interaction location during a predetermined period;
caching the historical interaction data in a processor device selected dynamically from the one or more processor devices based on computing capacity;
generating an interaction recommendation relating to the interaction location by executing the interaction instructions and by using the historical interaction data;
transmitting the interaction recommendation to the entity device;
receiving a second location indicating that the entity is not proximate to the interaction location; and
clearing, in response to receiving the second location indicating that the entity is not proximate to the interaction location, the cached historical interaction data from the processor device.

2. The system of claim 1, wherein the interaction instructions comprise a maximum aggregate value of interactions for the predetermined period, and wherein the operations further comprise:
determining that an aggregate value of the historical interaction data of the entity is equal to or greater than the maximum aggregate value of interactions for the predetermined period;
deactivating a set of objects associated with the entity, wherein the set of objects provide electronic resources at the interaction location;
receiving an entity input from the entity device indicating that the set of objects should be reactivated; and
reactivating the set of objects associated with the entity upon receiving the entity input.

3. The system of claim 2, wherein the maximum aggregate value of interactions for the predetermined period is a monthly budget limit, and wherein the set of objects comprises one or more financial accounts associated with the entity.

4. The system of claim 2, wherein the operations further comprise:
generating a score using the historical interaction data and the maximum aggregate value of interactions for the predetermined period, wherein the score is in a range from 0 to 100, wherein the score indicates a likelihood of the entity exceeding the maximum aggregate value of interactions.

5. The system of claim 1, wherein the interaction location is a website related to the predetermined entity preference, wherein the entity with which the entity device is associated is a first entity, and wherein the operation of accessing historical interaction data of the first entity comprises:
  determining that the website related to the predetermined entity preference is active on the entity device;
  identifying a second entity associated with the website; and
  accessing the historical interaction data of the first entity involving the second entity during the predetermined period.

6. The system of claim 1, wherein the historical interaction data is a training dataset, the training dataset comprising a group of data categories consisting of an interaction time, an interaction address, an interaction type, and an interaction value, and wherein the operations further comprise:
  training, using the training dataset, a machine-learning model to generate a trained machine-learning model; and
  executing the trained machine-learning model to generate the interaction recommendation relating to the interaction location.

7. The system of claim 6, wherein the operations further comprise:
  receiving interaction history data of the entity with a pre-scheduled frequency, wherein the interaction history data relates to past interactions of the entity, wherein the pre-scheduled frequency is daily;
  training the machine-learning model with the interaction history data as the training dataset in a batch manner with the pre-scheduled frequency; and
  executing the trained machine-learning model to generate the interaction recommendation with the pre-scheduled frequency.

8. A method, comprising:
  receiving, by a computing device from an entity device, a predetermined entity preference comprising interaction instructions for interactions involving an entity that is associated with the entity device;
  receiving, by the computing device, a first location indicating that the entity is proximate to an interaction location from the entity device;
  accessing, by the computing device, historical interaction data of the entity, the historical interaction data comprising data related to previously executed interactions that involve the entity and the interaction location during a predetermined period;
  caching, by the computing device, the historical interaction data in a processor device selected dynamically from one or more processor devices based on computing capacity;
  generating, by the computing device, an interaction recommendation relating to the interaction location by executing the interaction instructions and by using the historical interaction data;
  transmitting, by the computing device, the interaction recommendation to the entity device;
  receiving, by the computing device, a second location indicating that the entity is not proximate to the interaction location; and
  clearing, by the computing device, in response to receiving the second location indicating that the entity is not proximate to the interaction location, the cached historical interaction data from the processor device.

9. The method of claim 8, wherein the interaction instructions comprise a maximum aggregate value of interactions for the predetermined period, and wherein the method further comprises:
  determining an aggregate value of the historical interaction data of the entity is equal to or great than the maximum aggregate value of interactions for the predetermined period;
  deactivating a set of objects associated with the entity, wherein the set of objects provide electronic resources at the interaction location;
  receiving an entity input from the entity device indicating that the set of objects should be reactivated; and
  reactivating the set of objects associated with the entity upon receiving the entity input.

10. The method of claim 9, wherein the maximum aggregate value of interactions for the predetermined period is a monthly budget limit, and wherein the set of objects comprises one or more financial accounts associated with the entity.

11. The method of claim 9, further comprising:
  generating a score using the historical interaction data and the maximum aggregate value of interactions for the predetermined period, wherein the score is in a range from 0 to 100, wherein the score indicates a likelihood of the entity exceeding the maximum aggregate value of interactions.

12. The method of claim 8, wherein the interaction location is a website related to the predetermined entity preference, wherein the entity with which the entity device is associated is a first entity, and wherein the step of accessing the historical interaction data of the first entity comprises:
  determining that the website related to the predetermined entity preference is active on the entity device;
  identifying a second entity associated with the website; and
  accessing the historical interaction data of the first entity involving the second entity during the predetermined period.

13. The method of claim 8, wherein the historical interaction data is a training dataset, the training dataset comprising a group of data categories consisting of an interaction time, an interaction address, an interaction type, and an interaction value, and wherein the method further comprises:
  training, using the training dataset, a machine-learning model to generate a trained machine-learning model; and
  executing the trained machine-learning model to generate the interaction recommendation relating to the interaction location.

14. The method of claim 13, further comprising:
  receiving interaction history data of the entity with a pre-scheduled frequency, wherein the interaction history data relates to past interactions of the entity, wherein the pre-scheduled frequency is daily;
  training the machine-learning model with the interaction history data as the training dataset in a batch manner with the pre-scheduled frequency; and
  executing the trained machine-learning model to generate the interaction recommendation with the pre-scheduled frequency.

15. A non-transitory computer-readable medium comprising instructions that are executable by one or more processor devices for causing the one or more processor devices to perform operations comprising:

receiving, from an entity device, a predetermined entity preference comprising interaction instructions for interactions involving an entity that is associated with the entity device;

receiving, from the entity device, a first location indicating that the entity is proximate to an interaction location;

accessing historical interaction data of the entity, the historical interaction data comprising data related to previously executed interactions that involve the entity and the interaction location during a predetermined period;

caching the historical interaction data in a processor device selected dynamically from one or more processor devices based on computing capacity;

generating an interaction recommendation relating to the interaction location by executing the interaction instructions and by using the historical interaction data;

transmitting the interaction recommendation to the entity device;

receiving a second location indicating that the entity is not proximate to the interaction location; and clearing, in response to receiving the second location indicating that the entity is not proximate to the interaction location, the cached historical interaction data from the processor device.

16. The non-transitory computer-readable medium of claim 15, wherein the interaction instructions comprise a maximum aggregate value of interactions for the predetermined period, and wherein the operations further comprise:

determining an aggregate value of the historical interaction data of the entity is equal to or great than the maximum aggregate value of interactions for the predetermined period;

deactivating a set of objects associated with the entity, wherein the set of objects provide electronic resources at the interaction location;

receiving an entity input from the entity device indicating that the set of objects should be reactivated; and reactivating the set of objects associated with the entity upon receiving the entity input.

17. The non-transitory computer-readable medium of claim 16, wherein the maximum aggregate value of interactions for the predetermined period is a monthly budget limit, and wherein the set of objects comprises one or more financial accounts associated with the entity.

18. The non-transitory computer-readable medium of claim 16, wherein the operations further comprise:

generating a score using the historical interaction data and the maximum aggregate value of interactions for the predetermined period, wherein the score is in a range from 0 to 100, wherein the score indicates a likelihood of the entity exceeding the maximum aggregate value of interactions.

19. The non-transitory computer-readable medium of claim 15, wherein the interaction location is a website related to the predetermined entity preference, wherein the entity with which the entity device is associated is a first entity, and wherein the operations further comprise:

determining that the website related to the predetermined entity preference is active on the entity device;

identifying a second entity associated with the website; and accessing the historical interaction data of the first entity involving the second entity during the predetermined period.

20. The non-transitory computer-readable medium of claim 15, wherein the operations further comprise:

receiving the historical interaction data of the entity with a pre-scheduled frequency, wherein the pre-scheduled frequency is daily;

training a machine-learning model with the historical interaction data as a training dataset in a batch manner with the pre-scheduled frequency to generate a trained machine-learning model, the training dataset comprising a group of data categories consisting of an interaction time, an interaction address, an interaction type, and an interaction value; and executing the trained machine-learning model to generate the interaction recommendation.

* * * * *